(12) United States Patent
Moe

(10) Patent No.: US 8,453,372 B1
(45) Date of Patent: Jun. 4, 2013

(54) ARTICULATING FISHING ROD HOLDER

(76) Inventor: Greg D. Moe, Fairfield, CA (US)

( * ) Notice: Subject to any disclaimer, the term of this patent is extended or adjusted under 35 U.S.C. 154(b) by 185 days.

(21) Appl. No.: 12/718,433

(22) Filed: Mar. 5, 2010

(51) Int. Cl.
*A01K 97/10* (2006.01)
*A01K 97/12* (2006.01)

(52) U.S. Cl.
USPC ............... 43/21.2; 43/17; 248/514; 248/520; 248/523

(58) Field of Classification Search
USPC .................... 43/21.2, 17; 248/511, 514–517, 248/519–521, 523
See application file for complete search history.

(56) References Cited

U.S. PATENT DOCUMENTS

| | | | | |
|---|---|---|---|---|
| 2,314,747 A | * | 3/1943 | White | 43/21.2 |
| 2,454,458 A | * | 11/1948 | Kaetker | 248/514 |
| 2,548,328 A | * | 4/1951 | Thayer | 43/21.2 |
| 2,557,728 A | * | 6/1951 | Drumb | 248/540 |
| 2,628,443 A | * | 2/1953 | Weckerling | 43/15 |
| 2,650,052 A | * | 8/1953 | Bintz | 43/21.2 |
| 2,663,962 A | * | 12/1953 | King | 43/17 |
| 2,714,270 A | * | 8/1955 | Premo | 43/17 |
| 2,758,407 A | * | 8/1956 | Speidell | 43/19.2 |
| 2,773,326 A | * | 12/1956 | Calvert | 43/16 |
| 2,803,912 A | * | 8/1957 | Kellar | 43/16 |
| 2,840,330 A | * | 6/1958 | Minton | 248/515 |
| 3,010,687 A | * | 11/1961 | Hagberg | 248/515 |
| 3,187,456 A | * | 6/1965 | Apitz | 43/17 |
| 3,307,812 A | * | 3/1967 | Brenner | 248/539 |
| 3,309,808 A | * | 3/1967 | George, Sr. | 43/15 |
| 3,516,190 A | * | 6/1970 | Cook | 43/21.2 |
| 3,824,730 A | * | 7/1974 | Johnson | 43/17 |
| 3,906,653 A | * | 9/1975 | Williams | 43/21.2 |
| 4,033,062 A | * | 7/1977 | Denecky | 43/21.2 |
| 4,040,197 A | * | 8/1977 | Robbins | 43/15 |
| 4,043,070 A | * | 8/1977 | Lamothe | 43/21.2 |
| 4,161,839 A | * | 7/1979 | Ward | 43/21.2 |
| 4,244,132 A | * | 1/1981 | Hoffman et al. | 43/21.2 |
| 4,388,774 A | * | 6/1983 | Thoemke | 43/21.2 |
| 4,620,387 A | * | 11/1986 | Bloom | 43/17 |
| 4,642,930 A | * | 2/1987 | Graf | 43/17 |
| 4,739,575 A | * | 4/1988 | Behrle | 43/21.2 |
| 4,827,654 A | * | 5/1989 | Roberts | 43/21.2 |
| 4,829,697 A | * | 5/1989 | Nakata | 43/17 |
| 4,837,965 A | * | 6/1989 | True | 43/17 |
| 4,932,152 A | * | 6/1990 | Barlotta et al. | 43/21.2 |
| 5,050,333 A | * | 9/1991 | Debreczeni | 43/17 |
| 5,367,815 A | * | 11/1994 | Liou | 43/21.2 |

(Continued)

FOREIGN PATENT DOCUMENTS

FR 2843278 A1 * 2/2004
GB 2119612 A * 11/1983

(Continued)

*Primary Examiner* — Darren W Ark
(74) *Attorney, Agent, or Firm* — Montgomery Patent & Design, LLC; Robert C. Montgomery; Joseph Yaksich

(57) ABSTRACT

An apparatus that holds a fishing pole in an unattended manner and utilizes a clamp that attaches to the fishing pole comprising a pair of appendages pivotally connected to a yoke in a balanced manner. Such positioning allows the pole to float or bob and enables a vertical removal from the yoke upon catching a fish. This articulating action is more likely to attract fish due to the movement of the lure. The yoke can be connected to a common tripod that sits on a bank or other solid ground near a fishing location or may alternately be fixed to various other structures.

14 Claims, 3 Drawing Sheets

U.S. PATENT DOCUMENTS

| | | | | |
|---|---|---|---|---|
| 5,542,205 A * | 8/1996 | Updike | | 43/21.2 |
| 5,560,137 A * | 10/1996 | Herring | | 43/21.2 |
| 5,778,592 A * | 7/1998 | Malmberg | | 43/21.2 |
| 5,987,801 A * | 11/1999 | Anderson | | 43/17 |
| 5,992,080 A * | 11/1999 | Allen | | 43/15 |
| 6,079,142 A * | 6/2000 | Danser et al. | | 43/17 |
| 6,082,688 A * | 7/2000 | Wilson | | 248/538 |
| 6,295,755 B1 * | 10/2001 | Macaluso | | 43/21.2 |
| 6,438,889 B1 * | 8/2002 | Handy | | 43/21.2 |
| 6,463,691 B1 * | 10/2002 | Atkins | | 43/17 |
| 6,493,982 B1 * | 12/2002 | Macaluso | | 43/21.2 |
| 6,594,941 B1 * | 7/2003 | Anderson | | 43/17 |
| 6,622,421 B1 * | 9/2003 | Daniels | | 43/21.2 |
| 6,646,557 B2 * | 11/2003 | Brake | | 43/21.2 |
| 6,817,136 B2 * | 11/2004 | Novak | | 43/21.2 |
| 7,213,361 B1 * | 5/2007 | Perigo, Sr. | | 43/21.2 |
| 7,316,094 B1 * | 1/2008 | Bishop | | 43/15 |
| 7,395,628 B2 * | 7/2008 | Rayfield | | 43/21.2 |
| 7,406,795 B1 * | 8/2008 | Follmar | | 43/21.2 |
| 7,594,354 B1 * | 9/2009 | Chadwick | | 43/21.2 |
| 7,739,827 B2 * | 6/2010 | Keller | | 43/21.2 |
| 2007/0214706 A1 * | 9/2007 | Donato | | 43/21.2 |
| 2008/0022578 A1 * | 1/2008 | Follmar | | 43/21.2 |
| 2010/0122487 A1 * | 5/2010 | Snider | | 43/21.2 |
| 2012/0131841 A1 * | 5/2012 | Galbraith | | 43/17 |

FOREIGN PATENT DOCUMENTS

| | | | | |
|---|---|---|---|---|
| GB | 2178632 A | * | 2/1987 | |
| JP | 01157332 A | * | 6/1989 | |
| JP | 06284844 A | * | 10/1994 | |
| JP | 08131039 A | * | 5/1996 | |
| JP | 2000032897 A | * | 2/2000 | |
| JP | 2001292675 A | * | 10/2001 | |
| JP | 2001292676 A | * | 10/2001 | |
| JP | 2003235425 A | * | 8/2003 | |
| JP | 2004290131 A | * | 10/2004 | |
| JP | 2009136270 A | * | 6/2009 | |
| JP | 2009195252 A | * | 9/2009 | |
| JP | 2011092127 A | * | 5/2011 | |
| JP | 2011125230 A | * | 6/2011 | |

* cited by examiner

ARTICULATING FISHING ROD HOLDER

RELATED APPLICATIONS

The present invention was first described in a notarized Official Record of Invention on Jan. 2, 2009, that is on file at the offices of Montgomery Patent and Design, LLC, the entire disclosures of which are incorporated herein by reference.

FIELD OF THE INVENTION

The present invention relates generally to fishing equipment, and more particularly, to an apparatus for holding fishing rods having a coupling which allows the pole to freely wobble and be quickly removed.

BACKGROUND OF THE INVENTION

The technology used by anglers to catch fish has become increasingly complex in nature. Fishermen no longer rely on the traditional hook and worm approach to attract their game. Instead, a broad range of products have hit the market, designed to aid the fisherman in catching more fish and quickly. However, the fisherman typically still has to hold the rod no matter how advanced the technology. Additionally, while some may argue it is a perfect way to spend a day, long periods of holding a rod while nothing is happening can be boring, tedious, and physically tiresome. Many fisherman resort to attaching or bracing their rod against something to avoid the monotony of holding it, however this solution may result in lost fishing rods if they are not secured adequately or if a fish strikes a hook and pulls the entire rood and reel into the water.

Various attempts have been made to provide alternative means for supporting fishing poles. These devices typically rely on cradle to receive the fishing pole and some type of clamp or bracket to rigidly secure the fishing pole to some kind of support structure. The devices do not allow for any movement of the fishing pole which can make the bait less attractive for a potential bite. It can also be difficult to quickly and easily remove the fishing pole when immediately desired.

Some of these devices have latch and spring mechanisms to automatically set the hook in the mouth of the fish after the line is struck. These devices can be complex making them difficult to use and although the mundane act of holding the fishing pole is not desirable, many fishermen want to have more control over the precise moment to set the hook and reel in the reward.

Additionally, these devices typically do not provide a simple method of adjusting the angle of the fishing pole in relation to the support structure or the body of water which is being fished.

Examples of these attempts can be seen by reference in the following U.S. Pat. Nos.: 2,454,448, issued in the name of Kaetker, which describes a fishing pole holder; 2,548,328, issued in the name of Thayer, which describes a fishing pole holder; 3,010,687, issued in the name of Hagberg, which describes a fishing pole holder; 3,307,812, issued in the name of Brenner, which describes a fishing pole holder; 4,040,197, issued in the name of Robbins, which describes an automatic fishing pole holder; 4,388,774, issued in the name of Thoemke, which describes a fishing system; 4,739,575, issued in the name of Behrle, which describes a fishing pole holder mount; 4,932,152, issued in the name of Barlotta et al., which describes a fishing rod holder; 5,542,205, issued in the name of Updike, which describes an automatic hook setting fishing pole holder; and, 6,082,688, issued in the name of Wilson, which describes a down rigger adapter.

The disclosures of the above referenced examples are incorporated herein by reference. While the aforementioned devices may fulfill their respective, particular objectives, each suffers from one or more of the aforementioned disadvantage or deficiency with respect to design, function, or effectiveness. These devices fail to provide a simple yet effective means to hold a fishing pole while still offering the desired amount of control by the fisherman and allowing natural movement of the fishing pole, which is inexpensive to manufacture.

Accordingly, there is a need for a means by which a fishing pole can be attached to a stationary object while waiting for fish to strike and for a means by which the fisherman may be alerted to a potential fish strike in a quick manner to allow the fish to be reeled in. The development of the present invention substantially departs from the conventional solutions and in doing so fulfills this need.

SUMMARY OF THE INVENTION

In view of the foregoing art, the inventor recognized the aforementioned inherent problems and observed that there is a need for a novel means to hold a fishing pole for periods of unattended fishing while alerting the fisherman when the line is being struck my a fish and thus, the object of the present invention is to solve the aforementioned disadvantages and provide for this need.

Another object of the present invention is to provide an apparatus which can be mounted to various support structures, such as a tripod, allowing the apparatus to be used almost anywhere.

Another object of the present invention is to provide an apparatus in which the fishing rod can be supported. The apparatus enables the fishing pole to bob about a horizontal axis utilizing the handle and the reel as a natural counterweight, such that the bait appears to have a more natural and realistic action leading to catching more fish. The apparatus also holds the fishing pole captive not allowing the pole to inadvertently disengage and be lost.

Another object of the present invention is to provide an apparatus which secures around the fishing pole at a desired location and is size adjustable to allow for use with various types and sizes of fishing poles. The apparatus is quickly and easily removed along with the fishing pole in an instant when the fisherman notices the line being struck, such that the hook can quickly and forcibly be set in the mouth of the unsuspecting fish.

Yet another object of the present invention is to provide an apparatus which is simple and intuitive to use with little to no training.

Yet another object of the present invention is to provide an apparatus which is simple and economical to manufacture.

Accordingly, the above objectives and advantages are achieved by an apparatus comprising features which provide an articulating fishing pole holder comprising a tubular collar post for insertion within a circular receiving aperture of a support structure, a hollow cylindrical collar portion affixed to an upper end of the collar post, a tubular yoke post with a lower end insertable within the collar portion, a pair of opposing yoke forks forming a general "V"-shape converging at an upper end of the yoke post, a yoke slot in an upper end of each of said pair of yoke forks having a general "V"-shape with an outwardly angled side, an opposing straight edged side, and a rounded vertex, a clamp ring for receiving a handle of the fishing pole, and a pair of cylindrical support pins extending from opposing exterior sides of the clamp ring which removably fit within the pair of yoke slots. The collar portion is affixed to the collar post at an approximately twenty-two degree angle (22°). The yoke forks are affixed to the yoke post at an approximately twenty-two degree (22°) angle providing two (2) opposing angular configurations relative to the support structure. An angle of deflection of the outwardly angled side of the yoke slots opposes the twenty-two degree (22°) angle of the yoke forks. The clamp ring fits between the pair of opposing yoke forks. The support pins provide a means to enable the clamp ring to freely pivot about a horizontal axis between the pair of yoke forks. The clamp ring comprises a clamp ring slot located between the pair of support pins having a slot opening sized smaller than a diameter of a middle of a rod and a threaded set screw opposing the clamp slot and protruding through toward a center of the clamp ring providing a contact force to secure the fishing pole within the clamp ring. The set screw is selectably tightened based upon a diameter of the fishing pole.

Dependent on the placement of the clamp ring along a longitudinal axis of the fishing pole, a desired angle relative to the water surface may be obtained. If the fishing pole is to be angled relatively parallel to a water surface, then the clamp ring is secured at a rearward location. If the fishing pole is to be angled relatively further away to the surface of the water then the clamp ring is secured further forward along the fishing pole. The clamp ring is pivotally engaged to the yoke thereby allowing rotation or motioning of the fishing pole about the axis of the support pins.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
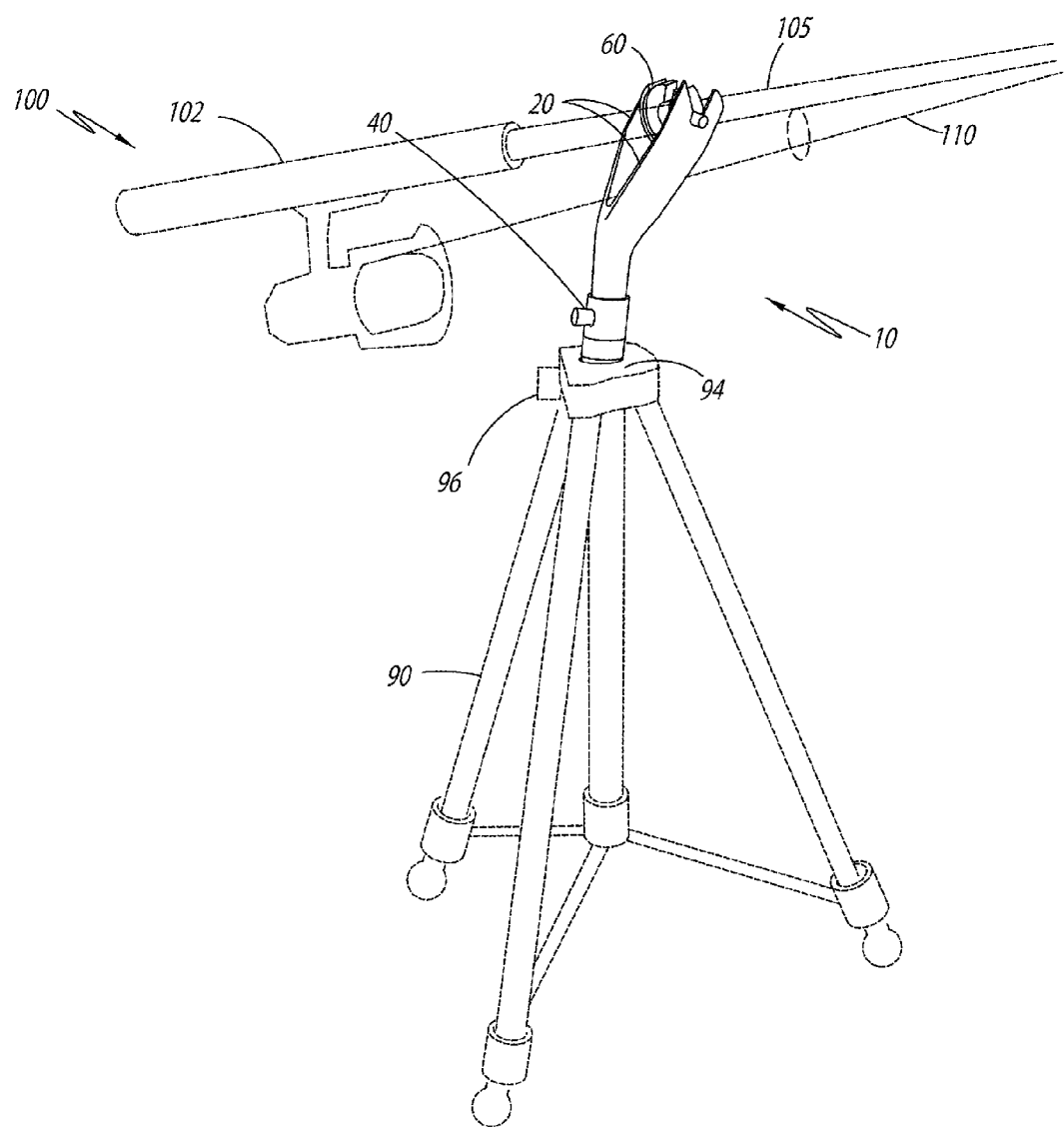
FIG. 1 is a perspective view of an articulating fishing rod holder 10 removably securing a fishing pole 100, according to the preferred embodiment of the present invention.

| 10 | articulating fishing rod holder |
| --- | --- |
| 20 | yoke assembly |
| 22 | yoke fork |
| 24a | yoke slot angled side |
| 24b | yoke slot straight side |
| 24c | yoke slot rounded portion |
| 26 | yoke post |
| 28 | first aperture |
| 40 | collar assembly |
| 42 | collar portion |
| 44 | collar post |
| 46 | collar opening |
| 48 | second aperture |
| 50 | quick-release pin |
| 60 | clamp ring assembly |
| 62 | clamp ring portion |
| 63 | clamp ring slot |
| 64 | support pin |
| 66 | clamp ring inner diameter |
| 68 | set screw |
| 70 | adapter |
| 72 | adapter orifice |
| 90 | tripod |
| 92 | tripod orifice |
| 94 | connection platform |
| 96 | tightening knob |
| 100 | fishing pole |
| 102 | handle |
| 105 | rod |
| 110 | fishing line |

DETAILED DESCRIPTION OF THE PREFERRED EMBODIMENT

The best mode for carrying out the invention is presented in terms of its preferred embodiment, herein depicted within FIGS. 1 through 3b. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method to hold a fishing pole 100 in an unattended manner during installation of bait or lures, and after a fishing line 110 has been cast to operably hold said fishing pole 100. The articulating fishing rod holder (herein described as the "apparatus") 10 comprises a "Y"-shaped yoke assembly 20, a "C"-shaped clamp ring assembly 60, and a collar assembly 40 for attachment of the apparatus 10 to an existing standard tripod base 90. The apparatus 10 allows a user to observe a motioning of the pole 100 when a fish strikes attached bait or lures.

Referring now to FIG. 1, a perspective view of the apparatus 10 removably securing a fishing pole 100, according to the preferred embodiment of the present invention, is disclosed. The apparatus 10 provides a means to motion a fishing pole 100 inwardly or outwardly within the apparatus 10 prior to a fishing activity, so as to balance said fishing pole 100 and produce a resultant desired angular position of said fishing pole 100 with respect to a dock, a water surface, or other reference surface. The fishing pole 100 is then secured to the apparatus 10 and the fishing activity commences. The major component parts of the apparatus 10 are envisioned being made of a rugged corrosion-resistant metal such as stainless steel, anodized aluminum, or the like, which provide sufficient strength. The apparatus 10 may be presented in a plurality of colors with the option of including decorative designs or motifs thereupon.

A tripod 90 is preferably utilized as a supporting structure to hold the apparatus 10 and the fishing pole 100 in a stabilized fashion. For simplicity sake, only a tripod 90 has been illustrated herein; however, it is understood that various stationary and portable structures may be utilized to mount the apparatus 10 such as, but not limited to: gunnels, gunwales, various mounted fixtures, and the like, without deviating from the basic concept and as such should not be interpreted as a limiting factor of the apparatus 10. It is envisioned that the user may utilize the tripod 90 to stand on a relatively flat surface such as a ground surface, a dock, a boat floor surface, or the like, to support the apparatus 10 and fishing pole 100. The tripod 90 is envisioned to be similar to those used for photography, hunting, and other activities. In use, a center tubular portion of the tripod 90 is removed resulting in a tripod orifice 92, thereby providing an attachment means to the apparatus 10. The tripod orifice 92 comprises a circular vertical female opening along a top surface of the tripod 90 being suitably sized so as to receive a collar assembly portion 40 of the apparatus 10 thereinto. The apparatus 10 may be rotationally secured to the tripod 90, if desired, using a tightening knob portion 96 of said tripod 90, if so equipped. Alternately, the apparatus 10 may be welded, bolted, or otherwise permanently fixed thereto the tripod 90 if so desired. It is further envisioned that the leg portions of the tripod 90 may be adjusted vertically in a normal manner to position the apparatus 10 at a desired elevation above a dock, boat floor, or the like.

As is well known, the tripod 90 is envisioned to comprise three (3) legs being joined together by a connection platform 94 to form a substantially single unit. When the legs are extended outwardly, the lower ends of the legs are placed on the supporting surface in a self-supporting tripod stance with the connection means extended vertically upward. The tripod legs extend outwardly to serve as a means to support and stabilize the apparatus 10 at an upward stance with respect to the supporting surface. A tripod orifice 92 centrally located upon the connection platform 94 provides a means for connection to the collar assembly portion 40 of the apparatus 10 (see FIG. 2). After utilization of the apparatus 10, the tripod 90 may be retracted for storage.

Figure 2:
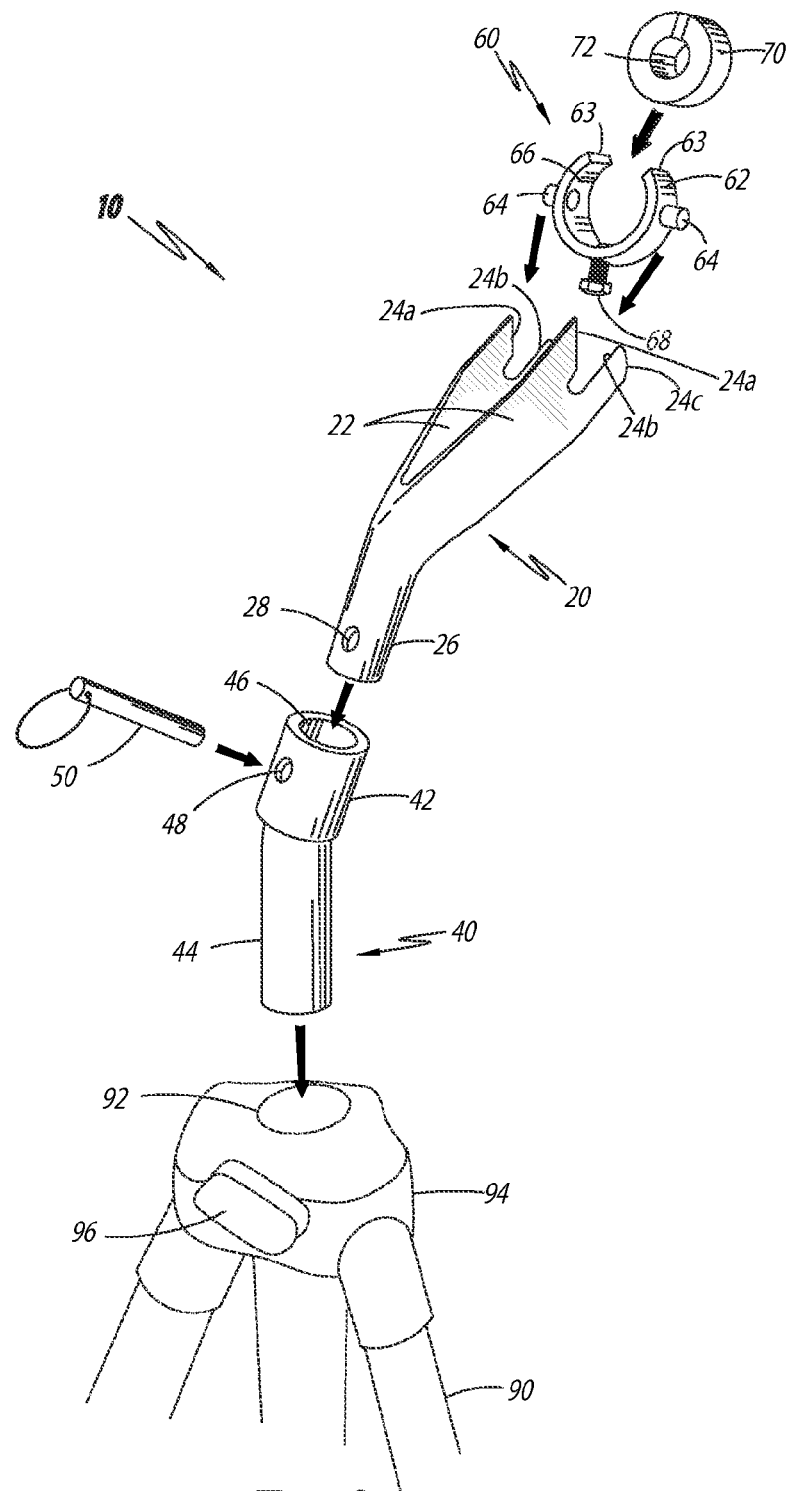
FIG. 2 is an exploded view of the articulating fishing rod holder 10 with individual components disengaged therefrom, according to the preferred embodiment of the present invention.

Referring now to FIG. 2, an exploded view of the apparatus 10, according to the preferred embodiment of the present invention, is disclosed. The apparatus 10 provides a holding means for a fishing pole 100 comprising a yoke assembly 20, a collar assembly 40, and a clamp ring assembly 60.

The clamp ring assembly 60 provides a clamping attachment to the fishing pole 100 via a partial circle or "C"-shape member comprising a clamp ring portion 62, a clamp ring slot 63, a pair of support pins 64, and a set screw 68. The clamp ring assembly 60 partially encircles and secures the cylindrical fishing pole handle portion 102 of the fishing pole 100. The span of the clamp ring slot 63 is not significant enough to allow passage of the fishing pole handle 102 of the fishing pole 100 therethrough. The clamp ring portion 62 further provides a tightening means to said handle 102 via a common threaded set screw 68. The set screw 68 threadingly protrudes through the clamp ring portion 62 in a perpendicular manner providing a contact force against the fishing pole handle 102 to secure a lateral position thereof. Alternately, the clamp ring assembly 60 may also be attached to a rod portion 105 of the fishing pole 100 via installation of a cylindrical rubber adapter 70. The adapter 70 comprises a split rubber grommet having a central adapter orifice 72 sized so as to match that of the rod portion 105. In use, the rod 105 is inserted into said adapter 70; the adapter 70 is inserted into the clamp ring portion 62; and, the adapter 70 including the fishing pole 100 are secured using the set screw 68 as previously described. The action of the set screw 68 allows installation and securement of multiple fishing poles 100 with handles 102 and rods 105 of various sizes. The clamp ring assembly 60 provides a pivoting attachment means to the yoke assembly 20 via a pair of integral cylindrical support pins 64 protruding laterally from opposing side surfaces of said clamp ring assembly 60. The support pins 64 provide removable nested attachment into corresponding yoke slot portions of the yoke assembly 20 allowing the fishing pole 100 to rotate about an axis formed thereby said support pins 64 within the stationary yoke assembly 20. The two (2) support pins 64 span a designated distance relatively perpendicular in relation to the center axis of the clamp ring portion 62. The support pins 64 span from a distance significant enough to be removably received in receiving yoke slot portions of the yoke assembly 20. The two (2) cylindrically-shaped support pins 64 are integrally attached to the clamp ring assembly 60 being removably inserted in yoke slot portions of respective yoke forks 22 so as to allow said clamp ring assembly 60 to motion upwardly therefrom. The support pins 64 are envisioned to hold the clamp ring assembly 60 in relative alignment comparative to the yoke assembly 20 and to permit said clamp ring assembly 60 to be rotatably pivoted or motioned in relation to the axis of said support pins 64.

The yoke assembly 20 comprises a pair of yoke forks 22 and a yoke post 26. The yoke forks 22 form a "V"-shape weldment and converge with each other at a bottom portion along a longitudinal axis of the yoke assembly 20. The upper end of each yoke fork 22 comprises a "V"-shaped yoke slot having an outwardly angled edge 24a and an opposing straight edge 24b having a rounded vertex portion 24c shaped to receive and accept the respective support pin portions 64 therewithin. The manner in which the support pins 64 are removably received in the yoke slots allows the support pins 64, thus the fishing pole 100 installed therein, to pivot and/or motion especially in a bobbing fashion thus further attracting fish to motioning bait or lures. The yoke forks 22 provide fixed positioning of the support pins 64 and the fishing pole 100 installed therein, and helps to maintain a desired position of said installed fishing pole 100. The clamp ring assembly 60 is pivotally connected with the yoke assembly 20 by means of the support pins 64 being removably received in the yoke slots. The yoke slots comprise "V"-shaped openings spanning from the upper end of each yoke fork 22 to a designated distance inwardly with the outwardly angled side 24a and the opposing straight edged side 24b, terminating with the relatively rounded vertex portion 24c specifically sized and shaped to removably receive each support pin 64. The opposing straight edged side 24b having a length which is generally parallel to a longitudinal axis of the respective yoke fork 22 and the outwardly angled edge side 24a having a length which is transverse to both the length of the opposing straight edged side 24b and the longitudinal axis of the respective yoke fork 22 (see FIG. 3A). The yoke slots allow pivotal and/or other directional movements of the clamp ring assembly 60 in relation to the yoke assembly 20 without allowing said clamp ring assembly 60 to be unintentionally disengaged from said yoke assembly 20.

The yoke forks 22 extend in a generally downward direction approximately six (6) inches being subsequently angled inwardly to conjoin at a top portion of the cylindrical yoke post 26 forming a rigid "Y"-shaped welded assembly comprising respective terminations of the two (2) yoke forks 22 and the yoke post 26. The yoke forks 22 and yoke post 26 are joined to form an included angle of approximately twenty-two degrees (22°) between a longitudinal axis of the yoke post 26 and a longitudinal axis of the two (2) yoke forks 22. The yoke post 26 comprises a downwardly extending cylindrical appendage approximately one (1) inch in diameter and approximately four (4) inches long. The yoke post 26 provides an inserting attachment means into a collar portion 42 of the subjacent collar assembly 40 being slidingly and rotatingly received into said collar assembly 40.

Figure 3A:
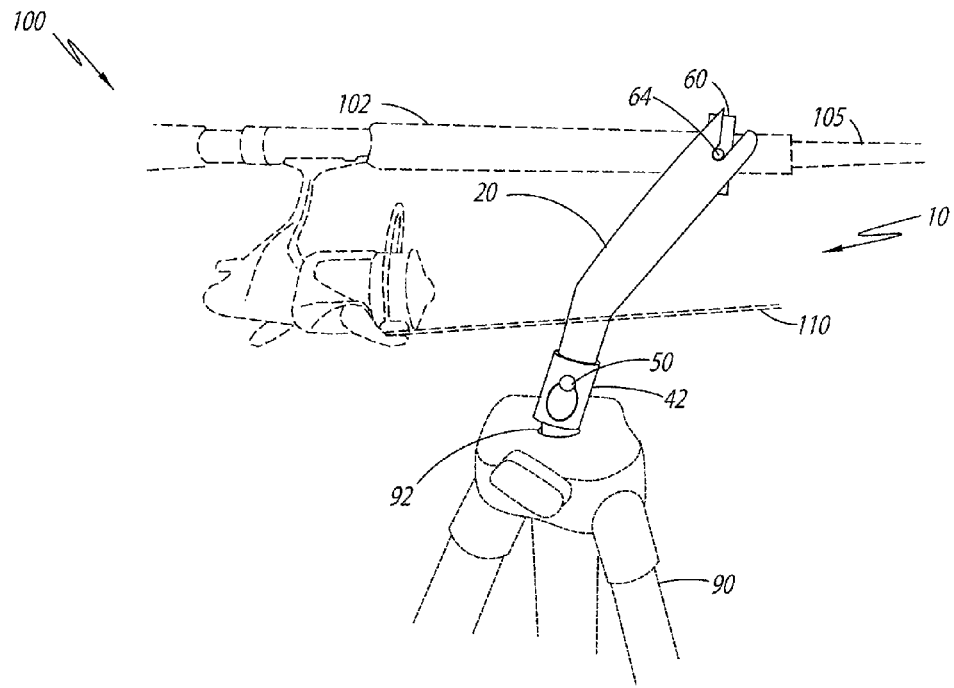
FIG. 3A is a side view of the articulating fishing rod holder 10 depicting a vertical configuration, according to the preferred embodiment of the present invention; and, FIG. 3B is a side view of the articulating fishing rod holder 10 depicting an angled configuration, according to the preferred embodiment of the present invention.
Figure 3B:
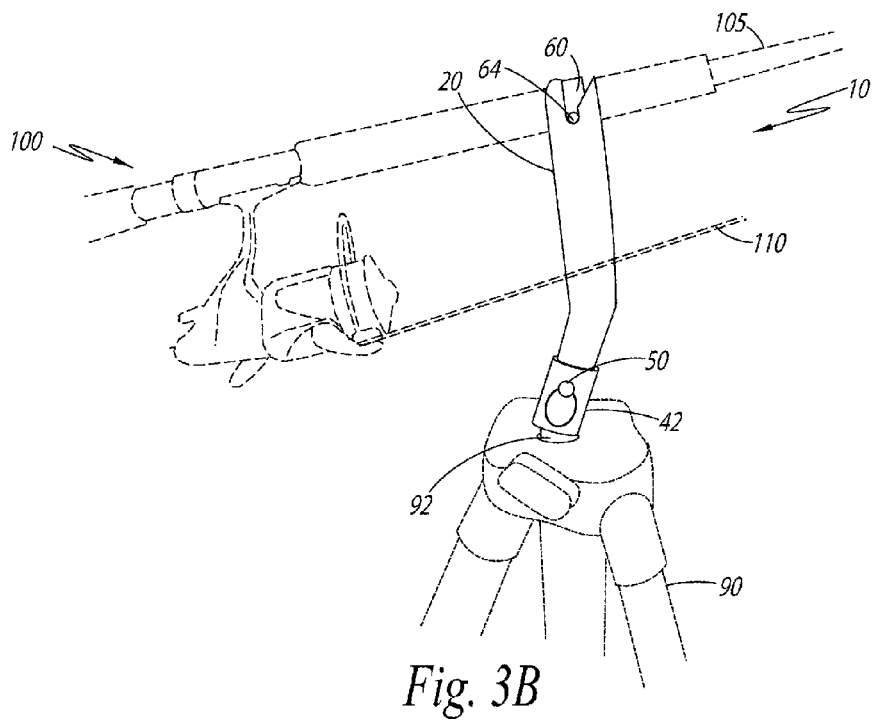

The collar assembly 40 comprises a one-piece angled tubular member providing rotating connection of the apparatus 10 to the tripod 90 as well as angular configuration of the yoke assembly 20 in relation to the tripod 90. The collar assembly 40 comprises a collar portion 42 and a collar post 44 being permanently joined to each other forming an angle of approximately twenty-two degrees (22°), thereby enabling the fork assembly 20 to extend from the tripod 90 at an angle so as to provide clearance for the fishing pole 100. The top-mounted collar portion 42 provides a cylindrical inner diameter sized to slidingly receive the aforementioned yoke post portion 26 of the yoke assembly 20 therewithin. The yoke post portion 26 and collar portion 42 further comprise a pair of first apertures 28 and a pair of second aperture 48, respectively. The apertures 28, 48 are arranged in opposing horizontal positions along outer surfaces of the yoke post 26 and collar portion 42, thereby allowing the yoke post 26 and the collar portion 42 to be vertically and rotatingly secured to each other via insertion of a quick-release pin 50 through the aligned apertures 28, 48. The apertures 28, 48 and inserted pin 50 allow positioning of the yoke post 26 within the collar portion 42 at one hundred and eighty degree (180°) intervals resulting in two (2) different angular configurations of the yoke assembly 20 within the tripod 90 as illustrated in FIGS. 3*a* and 3*b*. The collar post 44 comprises a cylindrical member being similar in construction to the aforementioned yoke post 26 providing downward vertical insertion into the tripod orifice portion 92, thereby stabilizing the apparatus 10 thereto. The tripod orifice portion 92 is made available via removal of a center tubular member of the tripod 90, thereby allowing sliding engagement of the collar post 44 thereinto. The collar post 44 may rotate freely within the tripod orifice 92 or may be rotationally secured to the tripod 90 using a common tightening knob portion 96 of said tripod 90, if so equipped, thereby allowing configurability of the apparatus 10 by a user.

Referring now to FIGS. 3A and 3B, side views of the apparatus 10 depicting vertical and angled configurations thereof, according to the preferred embodiment of the present invention, are disclosed. The apparatus 10 provides configurable attachment of the yoke assembly 20 to the collar assembly 60 resulting in expanded application to a variety of fishing pole 100 types and styles. Once secured together using the quick-release pin 50 as previously described, the angular characteristics between the yoke assembly 20 and the collar assembly 60 provide both vertical protrusion of the yoke assembly 20 (as depicted in FIG. 3A), and angled protrusion of said yoke assembly 20 (as depicted in FIG. 3B).

The preferred embodiment of the present invention can be utilized by the common user in a simple and effortless manner with little or no training. After initial purchase or acquisition of the apparatus 10, it would be configured as indicated in FIGS. 1 through 3*b*.

The method of utilizing the apparatus 10 may be achieved by performing the following steps: preparing a previously purchased tripod 90 to receive the apparatus 10 by removing a center tubular portion of the tripod 90, thereby exposing a tripod orifice portion 92; inserting the collar post portion 44 of the collar assembly 40 into said tripod orifice portion 92; inserting the yoke post 26 into the collar portion 42; positioning the yoke post 26 within said collar portion 42 at a desired rotational orientation resulting in vertical or angled positioning of the yoke assembly 20 based upon a particular fishing pole 100 style being used; inserting the quick-release pin 50 through respective first 28 and second 48 apertures; slidably placing the rod portion 105 through the clamp ring slot portion 63 of the clamp ring assembly 60; sliding the rod 105 within the clamp ring assembly 60 until the clamp ring portion 62 is positioned over the larger diameter handle portion 102 of the fishing pole 100 until the fishing pole 100 is properly balanced and resulting in a desired attitude of said pole 100 relative to a supporting surface; fixedly securing the clamp ring assembly 60 to the fishing pole handle 102 by turning the set screw 68 until said fishing pole 100 is held securely within; inserting the support pin portions 64 into the yoke slot portions of the yoke forks 22; rotating the apparatus 10 with respect to the tripod 90 until the fishing pole 100 is pointing in a desired direction; securing the apparatus 10 to the tripod 90 by tightening the provided tightening knob portion 96 of the tripod 90, if so equipped; and, utilizing the apparatus 10 to perform a fishing activity with added convenience and improved results afforded a user of the present invention 10.

The apparatus 10 is envisioned to be capable of securely holding fishing poles 100 of various sizes and is utilized to securely hold said fishing poles 100 at various specified distances and positions from the ground surface or boat floor surface. The components of the apparatus 10 provide minimum storage space with the clamp ring assembly 60, yoke assembly 20, and collar assembly 40 being designed to be easily disengaged from each other. The clamp ring assembly 60 is envisioned to be suitable to secure and withstand the weight of the fishing pole 100 and any force that may be exerted upon said fishing pole 100 such as when a fish strikes at bait or lures. The weight of the installed fishing pole 100 and the clamp ring assembly 60 is securely stabilized within the yoke assembly 20 within the yoke slots. The yoke assembly 20 is stabilized via insertion of the collar assembly 40 into the tripod 90 by the user. The tripod 90 is envisioned to be capable to withstand the weight of the apparatus 10 and the fishing pole 100 in a stabilizing fashion.

The clamp ring assembly 60 has two (2) support pins 64 that connect to a "Y"-shaped yoke assembly 20 in a balanced manner that allows the pole 100 to "float" or bob about yet remain firmly connected to the yoke assembly 20. This articulating action is more likely to attract fish due to the movement of the bait, lure, or the like. The yoke assembly 20 is preferably connected to a common tripod 90. It is further understood that the apparatus 10 may be separated from said tripod 90 and secured to various optional members associated with a boat or a dock such as a gunnel, gunwale, side of a boat, boat seat, or other fixedly stationary means or can also be sat on a bank or other solid ground near a fishing location.

Dependent on the placement of the clamp ring assembly 60 along a longitudinal axis of the fishing pole 100, a desired angle relative to the water surface may be obtained. For example, if it so desired that the fishing pole 100 be angled relatively parallel to a water surface, then the clamp ring assembly 60 should be placed at a rearward location; and, if it is so desired that the fishing pole 100 be angled relatively further away to the surface of the water then the clamp ring assembly 60 should be installed further forwardly along said fishing pole 100. The clamp ring assembly 60 is pivotally engaged to the yoke assembly 20 through means of support pin portions 64 of the clamp ring assembly 60, thereby allowing rotation and/or motioning of the fishing pole 100 about the axis of said support pins 64.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated.

What is claimed is:

1. An articulating fishing pole holder comprising:
    a cylindrical collar post having a lower end adapted to be mounted to a support structure and an upper end;
    a tubular collar affixed to said upper end of said collar post at an angle;
    a cylindrical yoke post having a lower end insertable within said collar and an upper end;
    a pair of spaced apart yoke forks extending from said upper end of said yoke post at an angle, said angle is less than perpendicular relative to a longitudinal axis of said yoke post;
    a yoke slot disposed at a distal end of each of said yoke forks having a straight-edged side, an opposing angled-edge side, and a rounded vertex, said angled-edged side having an angle of deflection opposite said angle of said yoke forks, said straight-edged side having a length which is generally parallel to a longitudinal axis of each of said yoke forks, said opposing angled-edge side having a length which is transverse to both the length of the respective opposing straight edged side and the longitudinal axis of each of said yoke forks;
    a clamp ring disposed between said pair of yoke forks and adapted to receive a cylindrical handle of a fishing pole; and,
    a pair of cylindrical support pins extending from opposing exterior sides of said clamp ring and removably fit within said yoke slots;
    wherein said yoke forks are selectably positionable between a generally vertical position with said yoke slot straight-edged sides facing outwardly and a generally forwardly angled position with said yoke slot angled-edged sides facing outwardly; and,
    wherein in use said fishing pole is free to pivot about a horizontal axis defined by said pair of support pins as a fish engages a line.

2. The fishing pole holder of claim 1, wherein said lower end of said collar post is insertable within a circular receiving aperture of said support structure.

3. The fishing pole holder of claim 2, wherein said collar comprises an inner diameter suitably sized to receive said yoke post lower end and an outer diameter larger than said receiving aperture of said support structure.

4. The fishing pole holder of claim 3, wherein said collar freely rotates within said receiving aperture of said support structure.

5. The fishing pole holder of claim 4, wherein said collar is rigidly secured within said receiving aperture of said support structure by a tightening means.

6. The fishing pole holder of claim 1, wherein said pair of yoke forks form a general "V" shape converging at said upper end of said yoke post.

7. The fishing rod holder of claim 6, wherein each of said yoke slots further comprises a general "V" shape;
    wherein said rounded vertex is suitably sized such that said support pins rest therewithin.

8. The fishing pole holder of claim 1, wherein said clamp ring further comprises a clamp ring slot located between said pair of support pins having a slot opening sized smaller than a diameter of a middle of a rod portion of said fishing pole.

9. The fishing pole holder of claim 8, wherein said clamp ring further comprises a threaded set screw opposing said clamp slot and protruding through toward a center of said clamp ring for providing a contact force to secure said fishing pole within said clamp ring;
    wherein said set screw is selectably tightened based upon a diameter of said fishing pole.

10. The fishing pole holder of claim 9, which further comprises a cylindrical rubber size-reducing adapter having an exterior diameter suitably sized to fit snugly within said clamp ring, a central aperture suitably sized to receive a rod portion of said fishing pole, and a split for providing a means to separate said adapter to wrap around said rod portion.

11. The fishing pole holder of claim 1, wherein said collar and said yoke post lower end further comprise apertures therethrough for securing together at said general vertical position and said generally forwardly angled position via a quick release pin;
    wherein said quick release pin fits through said apertures when aligned.

12. An articulating fishing pole holder comprising:
    a tubular collar post for insertion within a circular receiving aperture of a support structure;
    a hollow cylindrical collar portion affixed to an upper end of said collar post having an inner diameter and an outer diameter larger than said receiving aperture of said support structure, wherein said collar portion is affixed to said collar post at an angle;
    a cylindrical yoke post having a diameter of approximately one inch and a length of approximately four inches with a lower end insertable within said inner diameter of said collar portion;
    a pair of opposing yoke forks approximately six inches long forming a general "V" shape converging at an upper end of said yoke post, wherein said yoke forks are affixed to said yoke post at an angle providing two opposing angular configurations relative to said collar assembly;
    a yoke slot in a distal end of each of said pair of yoke forks having a general "V" shape with an outwardly angled side, an opposing straight edged side, and a rounded vertex, wherein an angle of deflection of said outwardly angled side of each of said yoke slots opposes said angle of said yoke forks;
    a clamp ring for receiving a cylindrical handle portion of said fishing pole, wherein said clamp ring fits between said pair of opposing yoke forks; and,
    a pair of cylindrical support pins extending from opposing exterior sides of said clamp ring which removably fit within said pair of yoke slots, wherein said support pins provide a means to enable said clamp ring to freely pivot about a horizontal axis between said pair of yoke forks;
    wherein said clamp ring further comprises a clamp ring slot located between said pair of support pins having a slot opening sized smaller than a diameter of a rod portion of said fishing pole and a threaded set screw opposing said clamp slot and protruding through toward a center of said clamp ring for providing a contact force to secure said fishing pole within said clamp ring;
    wherein said set screw is selectably tightened based upon a diameter of said fishing pole.

13. The fishing pole holder of claim 12, which further comprises a cylindrical rubber size-reducing adapter having an exterior diameter suitably sized to fit snugly within said clamp ring, a central aperture suitably sized to receive a rod portion of said fishing pole, and a split for providing a means to separate said adapter to wrap around said rod portion.

14. The fishing pole holder of claim 13, wherein said collar portion and said yoke post lower end further comprise apertures therethrough for securing theretogether via a quick release pin;
- wherein said quick release pin fits through said apertures when aligned; and,
- wherein said yoke post is selectably positioned, thereby providing two opposing angular configurations of said yoke forks.

\* \* \* \* \*